Jan. 7, 1969
W. T. ELLIOTT ET AL
3,420,403
AIR PRESSURE DETECTION SYSTEM
Filed July 3, 1967
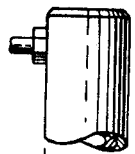

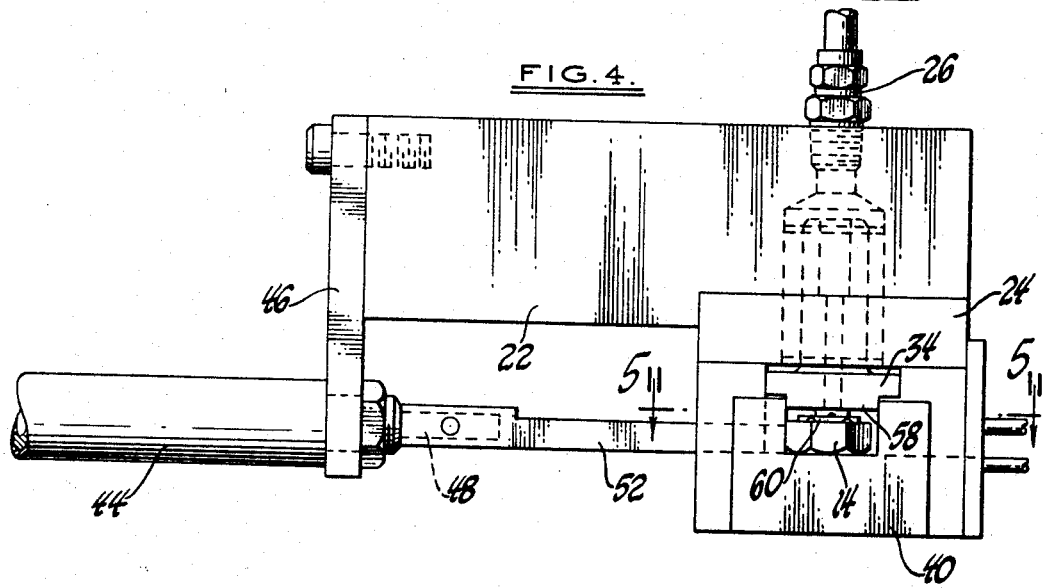
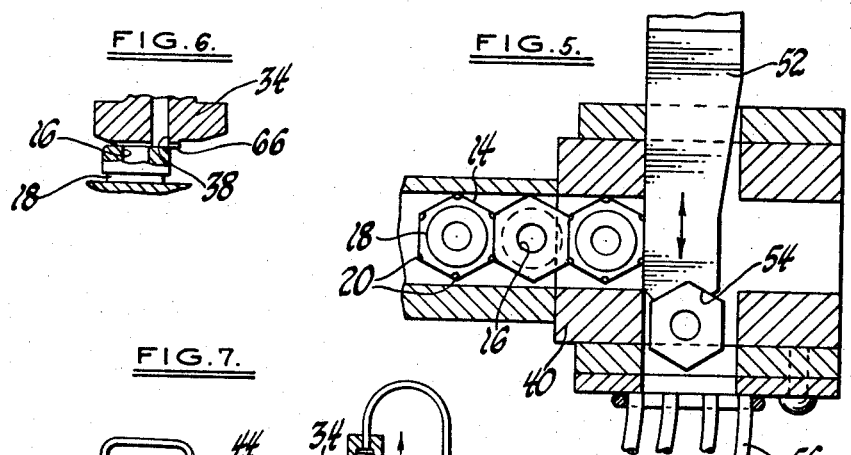
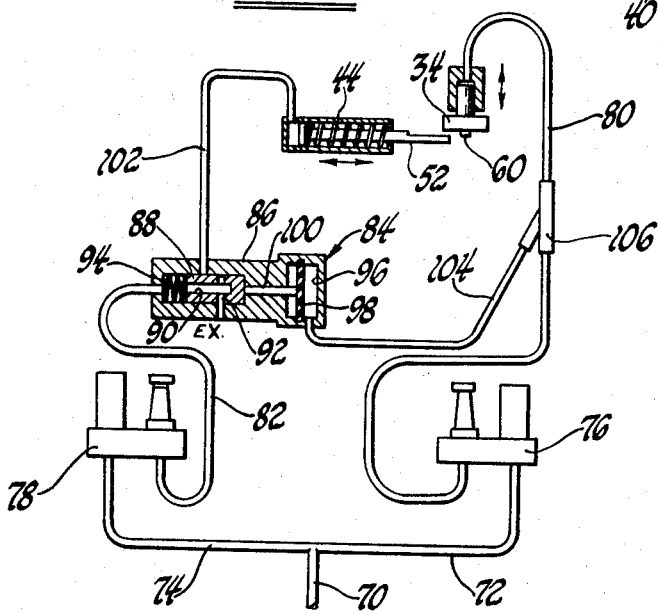

United States Patent Office 3,420,403
Patented Jan. 7, 1969

3,420,403
AIR PRESSURE DETECTION SYSTEM
William T. Elliott, Bloomfield Hills, and Kenneth H. Harris, Oxford, Mich., assignors to Elliott Die & Tool, Inc., Pontiac, Mich., a corporation of Michigan
Filed July 3, 1967, Ser. No. 650,759
U.S. Cl. 221—1                 14 Claims
Int. Cl. B65g 59/00

ABSTRACT OF THE DISCLOSURE

An air pressure responsive system for inspecting and sorting articles, including means for discharging air under pressure relative to the articles, sensing a change in line pressure when the discharge flow is obstructed, and activating the sorting means by a positive pressure signal impulse as a consequence thereof.

Background of the invention

Weld nuts for use with automatic welding equipment including a pilot ring and weld projections on one side face which are required to be received against the work to which they are to be secured. They are normally kept in bulk quantities in hoppers or vibrator bowls and are caused to be relatively aligned in series as they are transferred to the work station. However, the variable tolerances permitted the exterior dimensions of these small articles make it very difficult to arrange them so that they are all right side up or down as they are being transferred.

This same problem exists with other small articles which are required to be fed to automatic work stations for assembly, packaging and the like, and where there is no suitable gauging surface with which normal mechanical means for detecting differences and separating out those which are not properly oriented may be used with any certainty.

Electrical systems for inspecting and sorting small parts, particularly of the type mentioned, are generally too expensive, too sensitive, and too prone to failure for general shop use.

Air pressure responsive systems have not been known for such use, heretofore, but the advantages are numerous and make such a detection system highly desirable. Compressed air is readily available in most shops and manufacturing facilities, it is inexpensive to use, and the air discharge may be used to clean the parts of dirt, dust, filings and the like accumulated in storage. Moreover, most air operated mechanisms include a minimum number of parts so that there are less problems as regards failures, malfunctioning and down-time.

Summary of the invention

This invention relates to an air pressure responsive system for inspecting and sorting articles, and more particularly to a fully automatic system for inspecting articles in transit to automatic work station and separating out those articles which are not properly positioned for subsequent use.

Means are provided for supplying air under pressure for discharge through an aperture of a size related to a gauging surface area on the articles being inspected. Articles that do not register properly with the aperture, as they travel past it, obstructed the air flow discharge sufficient to cause a change in the line pressure which is used to signal means for removing the article from its normal course of travel.

A siphoning connection is used between the discharge air supply line and the signal means for operating the rejecting or diverting mechanism so that a negative air pressure condition is provided at the signal means. Consequently, minor variations in the line pressure will not activate the diverting mechanism. Only a sufficient blockage of the discharge aperture to both break the convection flow across the siphoning connection and introduce the line pressure to the signal means will trigger the system.

A diaphragm type valve is used for the signal means by being interposed in a supply line from the air pressure supply source to the mechanism for rejecting or diverting articles from their normal course of travel. When the pressure condition changes on the operative side of the diaphragm valve, from the normally maintained negative pressure condition to one closely equivalent to the positive line pressure, a surge of pressure from the source provides practically instantaneous activation of the means for removing improperly positioned parts from the feed line.

Variable tolerance dimensions in the articles being inspected, or in their relative positions, as necessary for free flow movement, are compensated for by both the means last mentioned and also by having the discharge aperture provided in a shoe which guides on the articles as they pass thereunder.

With weld nuts, the system is set up to gauge on the pilot ring and to reject those weld nuts which are upside down causing a larger surface area to cross the discharge aperture, obstruct the flow and signal operation of an air cylinder with a forked arm to push them out of the way.

As used with vibrator bowls, a return track may be used for parts sorted out or a guide-way which turns the parts over for use at another work station may be provided. It also follows that several inspection stations can be incorporated with a single feed station, either side-by-side, one over the other, or as is otherwise desired and feasible for a particular job.

A more thorough discussion of he invention, with reference to a preferred embodiment, as shown by the accompanying drawings, follows hereinafter.

Description of the drawing

FIGURE 1 is a top plan view of a working embodiment of the present invention as attached to the side of a vibrator bowl.

FIGURE 2 is a cross-sectional view of the device shown by the first drawing figure as seen in the plane of line 2—2 thereon.

FIGURE 3 is a bottom view of the air discharging shoe member as taken in the plane of line 3—3 of the second drawing figure.

FIGURE 4 is a side elevational view of the device shown in the first drawing figure separate from the vibrator bowl.

FIGURE 5 is a cross-sectional view as seen in the plane of line 5—5 in the fourth drawing figure, turned 90°, and showing a weld nut being rejected.

FIGURE 6 is a cross-sectional detail view of the air discharging shoe as engaged with a weld nut to be rejected.

FIGURE 7 is a schematic illustration of the overall system showing the air flow connections to different parts.

Detailed description

The inspection and sorting device 10 is best shown and described by reference to FIGURES 1–4 showing it in one preferred form or embodiment in which it is mounted on the side of a vibrator bowl 12. The vibrator bowl is of the conventionally known type which includes an inclined ramp along an inner side wall and over which the articles in the bowl progress automatically in series towards a feed chute or the like.

In the present instance, the vibrator bowl 12 retains a supply of weld nuts 14 which are shown in the various drawing views to include a hexagonal shape with a center hole 16 and to have a pilot ring 18 with corner weld projections 20 provided on one side face. It is this side face which is intended to be received against a work piece and to be welded thereto by automatic welding equipment at a remote work station.

The inspection and sorting device 10 includes a housing 22 with an enlargement 24 at one end that has an air line fitting or connection 26 provided in the upper end which communicates with an enlarged bore 28 that extends downwardly. In the bore 28 is provided a sleeve bushing 30 which receives the shank 32 of a shoe member 34 so that the latter is vertically reciprocal under an air pressure load in the bore as well as under the influence of gravity.

An air passage 36 is provided through the shank 32 of the reciprocal shoe member 34 and terminates in an aperture 38 which is of a particular dimension relative to a gauging surface on the articles being inspected, as will later be described.

The housing part 24 is formed to accommodate the shoe member 34 and to have a guideway 40 provided thereunder and across which the weld nuts 14 are progressed in series relatively past the air passage aperture 38 in the shoe member. The guideway member 40 is formed at one end for mating engagement with the feedway 42 from the vibrator bowl 12, and at the other end for engagement with the feed chute or like member (not shown) which would normally attach to the vibrator bowl feedway and leads to the automatic equipment which uses the weld nuts. The guideway member 40 has side walls spaced apart a distance slightly more than the width of the weld nuts, from point-to-point, to allow their free flow movement and for them to align themselves in series as shown in FIGURE 5.

As will be appreciated, some of the weld nuts will have the pilot ring 18 and weld projections 20 disposed upwardly and others will be reversed with the flush side of the weld nut turned up, as shown by FIGURE 6. The function of the inspection and sorting device 10 is to determine which are wrong-side-to for delivery to the automatic welding equipment, and to sort them from the normal course of travel as by rejecting them, returning them to the vibrator bowl (as shown in the present instance) or diverting them to another feedway which will turn them over so that they may be used at another work station.

The operating mechanism for rejecting or sorting weld nuts which are upside down includes an air cylinder 44 which is mounted by a supporting arm 46 on the housing 22 at a spaced distance from the air head part 24. The piston rod end 48 of the piston member in the cylinder is engaged as by a set screw 50 to a reciprocal slide member 52 with a forked end 54. Opposite side walls of the housing part 24 and of the guideway member 40 are cut away to accommodate the relatively flat slider member 52 on one side and to pass weld nuts selected thereby through the other side and into a return chute 56 formed of wire rod and leading back into the vibrator bowl 12.

Returning now to a closer look at the shoe member 34, it is afforded limited travel over the guideway member 40 and has a center section 58 on its underside that is received between the guide rails or walls, between which the weld nuts pass, with a still lower protruding feeler part 60 that is intended to engage the different weld nuts as they pass thereunder. The opposite ends of the shoe member are chamfered, as at 62 and 64, for easier movement of the weld nuts relative thereto, and an air bleed groove 66 is provided lengthwise of the feeler part 60 and so that it is open at opposite ends, as is best seen in FIGURES 2 and 3.

The aperture 38 in the shoe member 34 is shown by FIGURE 2 to be just slightly oversized with respect to the radial dimension of the pilot ring 18 and by FIGURE 6 to be undersized relative to the radial dimension of the nut on its opposite side face. Accordingly, weld nuts with their pilot rings turned up will not as effectively obstruct the air flow discharge through aperture 38 as will those with the opposite side of the weld nut turned up. At the same time, in both instances the air bleed groove 66 functions and in the latter instance assures against a complete obstruction and blockage of the air flow passage aperture.

Air under pressure is discharged through the aperture 38 continuously as the weld nuts pass thereunder except as a sufficient obstruction occurs by a weld nut which is bottom-side-up to cause a change in the line pressure due to back pressure. It is this change in line pressure which is used to activate the air cylinder operating the slider member 52 and accordingly the weld nut, when inspected, is disposed within the break in the side walls through which the forked end of the slider moves to convey the nuts through the other side and back to the vibrator bowl or elsewhere, as previously mentioned.

The overall system is best shown and illustrated by FIGURE 7.

A source of air under pressure (not shown) is connected to a trunk line 70 from which it flows through branch lines 72 and 74 to air filtering regulator units 76 and 78. An air passage line 80 conveys the compressed air for discharge to the air line connection 26 in the housing part 24 from whence it passes through the aperture 28 in the shoe member 34 and impinges on the weld nuts as they pass by. The other regulator unit conveys air under pressure through an air line 82 to one side of a control valve 84.

The control valve 84 includes a housing 86 in which is provided a piston-like plunger member 88 with a center bore 90 and a cross passage 92 near its terminal end. Air under pressure and a light biasing spring 94 normally hold the member 88 so that its cross passage connects to an air bleed or exhaust opening in the housing side wall. However, an enlarged chamber area 96 in the other end of the valve housing accommodates a diaphragm member 98 which has a rod extension 100 that engages the closed end of the plunger member 88 and is capable of shifting it so that the cross passage 92 communicates with the air supply line 102 to the air cylinder 44.

The diaphragm chamber area 96 is connected by an air passage line 104 to the siphoning leg of an air flow siphoning connection 106 in the air discharge supply line 80.

The air pressure regulating units 76 and 78 are used to set the air pressure for discharge through aperture 38 at between 25–40 p.s.i. and at the air cylinder 44 at about 25 p.s.i. Normal air flow through the discharge supply line 80 induces a negative pressure condition in the diaphragm chamber area 96, through the convection flow across the connecting air line 104, by use of the siphoning connection 106, and holds the diaphragm actuated rod 100 from engagement with the control valve plunger 88. The compressed air and light spring pressure accordingly hold the plunger in the position shown with an air exhaust to the atmosphere.

When a weld nut with its pilot ring 18 disposed to cross the discharge aperture 38, moves under the reciprocal shoe member 34, the obstruction is insufficient to disrupt the siphoning flow to the control valve and accordingly the weld nut is allowed to pass. However, should the weld nut be upside down, as shown by FIGURE 6, the obstruction, despite the air bleed allowed by the air bleed groove 66 in the feeler 60, will change the line pressure and cause a back pressure which will both break the convection flow to the control valve 84 and introduce a positive pressure impulse that will activate the diaphragm member 98 and its rod 100 extension to shift the plunger 88 and allow air under pressure to activate the air cylinder 44 and reject the offending weld nut.

Immediately upon having the objectionally positioned weld nut removed, the discharge flow is as before, the siphoning flow is re-established, the plunger 88 is shifted to its exhaust position, air is cut off from the air cylinder 44 and its return spring acts to retract the slider for the next time it is called into service. The rapid response afforded by the system enables as many successive weld nuts as may be upside down to be rejected without any mishap whatsoever or malfunctioning of the apparatus.

From the foregoing, it will be appreciated that relatively minor variations in surface area on different faces of an article may be used for inspecting small articles and determining their relative positions. Where the surface area differences are so slight that the change in line pressure is insufficient to be of any work use, a siphoning connection provides a sensitivity control with a positive pressure signal response.

Continuous air flow through the system, by use of the air bleed groove in the feeler and exhaust at the control valve, keeps dirt from accumulating which might cause an obstruction and malfunctioning. Relatively few movable parts are used and changes in air pressure are used principally to activate the control means and cause the apparatus to perform its intended function.

The particular embodiment shown and illustrated is, of course, only to enable a more comprehensive discussion of the present invention. Accordingly, no undue limitations are to be drawn from the description given and such modifications and improvements as come within the spirit and scope of the invention, as set forth by the hereinafter appended claims, are to be considered as inclusive therewithin.

We claim:

1. A system for inspecting and sorting articles, comprising
   air passage aperture means for distinguishing the surface area differential of successive article relative to their orientation,
   diverting means operatively connected to said distinguishing means and responsive thereto for selectively sorting the articles into those in like relative positions,
   means for connecting a like source of air under pressure to each of said distinguishing and diverting means,
   and pressure responsive means interposed in the source connection to said diverting means and providing the operative connection between said distinguishing and diverting means.

2. The inspecting and sorting means of claim 1,
   said pressure responsive means being provided between the source connecting means and being responsive to a substantially like pressure condition therein for activating said diverting means.

3. The inspecting and sorting means of claim 2, including:
   an air passage siphoning connection provided between said pressure responsive means and the source connecting means to said distinguishing means.

4. The method of inspecting and sorting articles, comprising;
   relatively aligning articles for inspection in series,
   discharging air under pressure relative to a similarly disposed surface of said articles,
   sensing the line pressure of the air being discharged,
   and selectively sorting said articles in response to a like line pressure condition sensed in regard to those articles similarly oriented.

5. The method of claim 4, including;
   drawing a negative pressure on the sensing means in the course of unobstructed air flow discharge and using the obstructed flow to provide a positive pressure signal thereto.

6. An apparatus for automatically feeding a series of articles to an automatic work station and requiring a like relative positioning of the articles received thereby, means for inspecting the articles in transit and automatically diverting those which are not acceptable positioned, characterized by;
   a source of air under pressure including air passage means and a discharging aperture for directing air flow against a similarly disposed surface of said articles while in transit,
   means for diverting selected of said articles while in transit from their normal course of travel,
   and air pressure responsive means operatively connected to said diverting means for activation thereof and to said air passage means for sensing a change in the pressure condition of air flow therethrough upon the obstruction of said discharging aperture by articles not acceptably positioned for use at said automatic work station.

7. The inspecting and diverting means of claim 6,
   said discharging aperture being sized over dimension relative to surface protrusions used for inspection purposes and undersize relative to other surface areas inspected thereby.

8. The inspecting and diverting means of claim 6,
   said discharging aperture being provided in a member guiding on the articles inspected and self-adjusting to accommodate dimensional variations relative thereto.

9. The inspecting and diverting means of claim 6,
   said air pressure responsive means including a diaphragm valve operative of said diverting means and including a siphoning air flow connection to said air passage means for drawing a negative air pressure condition thereon during normal air flow discharge and providing a positive pressure impulse thereto upon the obstruction thereof.

10. The inspecting and diverting means of claim 9, including;
    air passage means connecting said air pressure source to said diverting means and having said diaphragm valve operatively disposed for opening and closing the connection thereto.

11. In an air pressure responsive detection system including means for sensing a change in line pressure resulting from an obstruction to normal air flow through a supply line, the improvement comprising;
    an air flow siphoning connection between the sensing means and the supply line for drawing a pressure below line at the sensing means during normal air flow and providing line pressure thereat in response to an increase in line pressure resulting from an obstruction to normal air flow discharge.

12. The improvement of claim 11,
    the siphoning connection including a through flow passageway in the supply line and a relatively smaller sized connecting passageway to said sensing means at a negative angle relative to the direction of normal air flow in said supply line.

13. The improvement of claim 12, said sensing means including a diaphragm member having one side thereof responsively disposed with respect to said connecting passageway.

14. The improvement of claim 13, the responsive sides of said diaphragm valve being in closed communication with said connecting passageway for drawing a negative pressure condition thereon in the course of siphoning air flow through said connection.

References Cited

UNITED STATES PATENTS 3,307,678    3/1967    McCollough et al. _ 221—156 X

SAMUEL F. COLEMAN, *Primary Examiner.*

U.S. Cl. X.R.

221—156